July 1, 1958  E. S. MARIOTTE  2,841,408
COLLAPSIBLE GOLF CART
Filed April 30, 1954
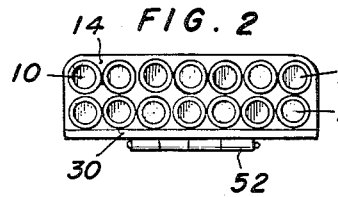
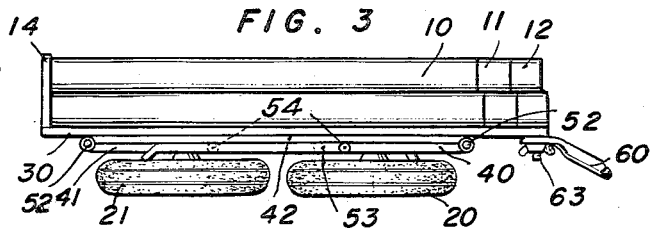
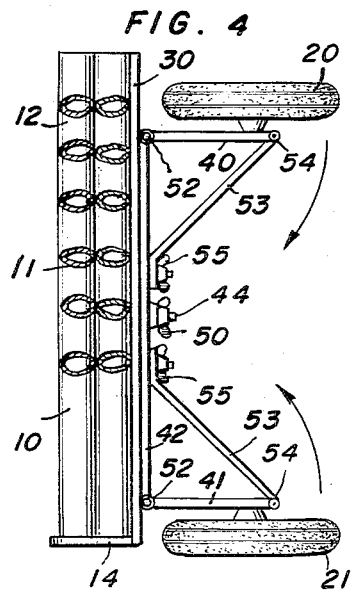
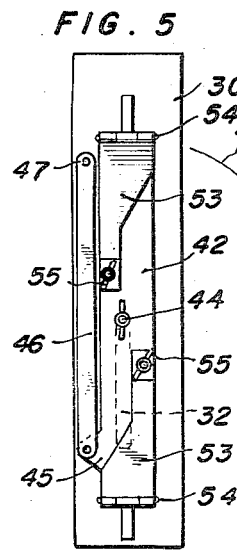
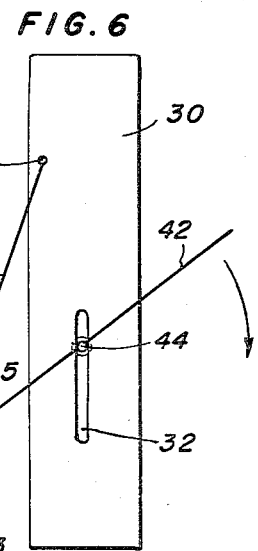
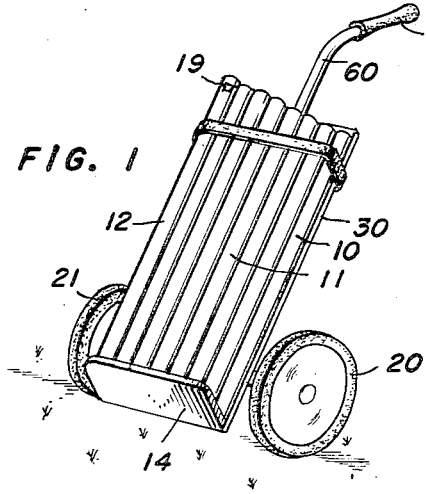
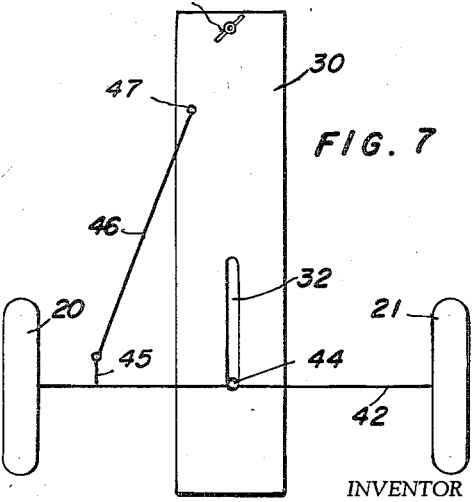
INVENTOR
EUGENE S. MARIOTTE
BY Myron P. Laughlin
ATTORNEY

2,841,408
COLLAPSIBLE GOLF CART

Eugene S. Mariotte, St. Petersburg, Fla.

Application April 30, 1954, Serial No. 426,629

4 Claims. (Cl. 280—38)

This invention relates to hand carts and more particularly to that type of hand cart commonly termed a golf cart.

It is a primary purpose of this invention to provide a golf cart which will be light in weight and compact in form and eliminate some of the faults heretofore inherent in such structures.

Labor shortage has made it necessary for the golfer of average means to carry his own golf clubs and to be able to transport these in his automobile along with whatever wheeled support their weight requires. The above requirements have resulted in the production of large numbers of so-called golf carts to carry the golfer's clubs and the necessary golf balls about the golf course.

It is one of the objects of this invention to provide a golf cart which will carry a complete complement of playing clubs over the golf course and rough terrain without undue difficulty as to pushing the same or maneuvering it over steps and like obstacles.

It is a paramount object of this invention to provide a golf cart capable of all of the above functions and having its running gear so constructed that it may be folded into extremely compact dimensions for loading into the restricted compartments of the owner's automobile without removing luggage and personal effects carried in such places.

It is also a purpose of this invention to provide a golf cart body which will provide individual spaces for each of the playing clubs making them readily available for use and at the same time protecting them from contact with the other such clubs held in the bag body.

A further purpose of this invention is to accomplish the functions set forth in the preceding paragraph, while at the same time, providing a substantially rectangular cross-section bag body which will store more readily and compactly than the usual soft type bag.

Certain other objects of this invention will appear as the appended description progresses and by reference to the attached drawing in which:

Fig. 1 is an elevation in perspective of a preferred embodiment of my invention in position for use on the golf links.

Fig. 2 is a top view of such cart in folded position.

Fig. 3 is a side view of the same embodiment, also in folded position but with the folded parts in slightly different dimension.

Fig. 4 is a side view with the bag portion broken away and golf cart body and chassis with the wheels extended but with the chassis still parallel to the body before its final swing to the running position shown in Fig. 1.

Figs. 5, 6 and 7 are views of the chassis and body mechanism employed to fold and compact the running gear for transport in an automobile. These views are in the main diagrammatic, Fig. 5 illustrating the chassis disposed in the storage position in which it is contained within the length and width dimensions of the back or body member of the cart.

Referring now to Fig. 1, the body of my improved golf cart preferably employs a series of tubes 10, 11 and 12 standing upon a common support 14 attached to a generally flat, elongated back or body member 30. Tubular body components 10, 11 and 12 differ from each other only in dimension and provide individual receptacles for each of the player's clubs, each such club being held individually in its own compartment and separated from all of the other clubs by the tube balls.

The general arrangement of the tubes which have been described is perhaps best understood by reference to Fig. 2 (wherein the wheels 20 and 21 are shown in folded position). It will be understood that tubes 10, 11 and 12 are held to the body 30 by bottom 14 and such means as strap 17, and may be individually replaced should they become damaged. The tubes are preferably arranged in groups to accommodate the various club sizes and may bear insignia, such as 19, to indicate the particular club which belongs in a particular tubular compartment. It will be manifest that this arrangement at once provides for the secure mounting of few or many golf clubs in such fashion that each will be securely held, will not be damaged by the other clubs and will always present a rectangular structure which stores compactly and securely upon any flat surface.

The necessary wheels 20 and 21 and their supporting brackets 40 and 41 of chassis 42 have always presented a substantial storage problem and many complicated structures have been conceived to fold these wheels into smaller space than they require to provide a substantial running gear for the golf cart. This invention provides a simplified structure and method of folding such wheels, not simply into dimensions smaller than required for running gear, but also into a position parallel with the rectangular club body which has been described, thus providing flat surfaces parallel to the flat surfaces of the cart body, so that the whole may be laid upon a compartment surface or upon another golf cart similarly folded when more than one such cart has to be stored or transported by automobile.

My improved running gear includes a generally flat and elongated chassis 42 mounted at substantially its center 43 on a pivot piece 44 sliding in slot 32 of body 30. The various positions of pivot piece 44 in slot 32 are best seen in Figs. 6 and 7 herein, the chassis parts involved being shown in diagrammatic form. Chassis 42 is also provided near one end thereof with a sideward extension 45 joined by a link 46 to pin 47 on body 30 and it will be clear by referring to Figs. 5, 6 and 7 (in that order) that rotating chassis 42 on pivot 44 in the direction of the arrow 49 will cause link 46 to draw projection 45 and with it one end of the chassis 42 upward, and that further rotation of the chassis will bring the axles of wheels 20 and 21 into a position at right angles to the body 30, as shown in Fig. 7. It will be understood that a clamping nut 50 (shown in Fig. 4) may be employed to clamp such chassis and its pivot to the body in the desired positions. Wheel brackets 40 and 41 are preferably hinged to chassis 42 as at 52 and such brackets are provided with braces 53 hinged in turn to the brackets at 54. Braces 53 are secured by clamps 50 and 55 on body 30 clamp 50 serving to hold the braces 53 when folded and clamps 55 serving to supplement and reinforce the diagonal brace position when opened to hold the wheel brackets extended. It being understood that braces 53 pass upon either side of the central pivot clamp 50 when collapsing to the storage position shown in Fig. 3 and that in this position clamp 50 holds them flat against chassis 42. Such construction provides that the wheels may be extended, as shown in Fig. 4 or folded, as shown in Figs. 2 and 3 for the purposes of use and storage described. Rotation of chassis on the body in opposite direction permits ready folding of the chassis.

Body 30 may also be provided with a handle 60 having a hand grip 62 and pivoted to the body 30 through such means as the bolt 63, so that it too may be folded down against the body for storage.

Consideration of the above description and drawings will show that a very compact foldable structure has been provided and that, at the same time, the quick easy operation of simple clamps will secure the whole rigidly in extended position for use.

It will be manifest that although the structure is extremely simple and the embodiment shown presents an advantageous one, the chassis and body portions may be equally well employed when a golf bag of the ordinary soft type is employed and that many other modifications are well within the scope of my invention and the spirit of the appended claims.

What I claim is:

1. A golf cart comprising, in combination, an elongated club-holding body member, a handle pivotally connected to said body member to fold with respect thereto, a wheeled chassis pivotally connected to the back side of said body member for bodily movement in a plane parallel to the body member to and from a use position in which it is disposed at right angles to said body member from and to a storage position in which it extends lengthwise of the said body member, said body member being provided with elongated slide means for the chassis pivot, a link pivotally connecting the body member and said chassis at a point on the latter removed from said chassis pivot and operative to impart lengthwise movement to the pivot means in the slide means with pivotal movement of the chassis about said pivot means, releasable means for holding said chassis in the one or the other of said use and storage positions to which it has been actuated, wheel brackets hingedly connected to the chassis adjacent its ends for folding movement against the chassis, and wheels mounted on said wheel brackets to turn on a common axis extending along the chassis.

2. A folding-wheel golf cart comprising, in combination, a body member having a longitudinal pivot-receiving slot, a link pin mounted on the body member beyond one end of the slot, a rigid chassis member lying substantially against said body member and having a central pivot engaging in said slot thereby to secure said chassis member to the body member and being movable along said slot to and from use and storage positions with respect to the body member, said chassis having a projection extending from a side thereof, a link connected at its ends to said link pin and said projection, respectively, and being effective to shift the chassis pivot along the slot with turning of the chassis member on said pivot axis, wheel bracket members hinged to the chassis member and being extensible from and foldable against said chassis member, wheels carried by said wheel bracket members and being extensible and foldable therewith, and clamping means for securing said chassis member and said wheel bracket members in use or storage position as the user may elect.

3. A golf cart including, in combination, a body member having means for receiving and supporting a plurality of golf clubs with their shafts disposed substantially parallel with each other and with said body member, a rigid chassis member mounting ground-engaging wheels for supporting the body member, said body member having a longitudinally extending slot and said chassis member having a pivot located at substantially its longitudinal center which is engaged in said slot, said pivot and slot providing a connection between body and chassis members permitting the chassis member to swing to and from a use position in which it is disposed at a right angle to the body member from and to a storage position in which it extends lengthwise of the body member and is contained substantially within the length and width dimensions thereof, and a fixed-length link member pivotally connected to both the body and chassis members at points thereof which are so located that the link imparts sliding movement of the pivot along the slot and corresponding longitudinal movement of the chassis member with respect to the body member with turning movement of the chassis member about the pivot axis.

4. A collapsible golf cart comprising a substantially flat and elongated body member having a longitudinal pivot-receiving slot therein, an elongated chassis member disposed substantially flat against the rear side of the body member and having a pivot engaging in said slot and slidable therealong, wheels hingedly supported adjacent the ends of the chassis member for folding movement against the under side thereof, and a link member secured at one end to said body member at a point thereof removed from the slot and at its other end to said chassis member at a point thereof removed from its said pivot, said link being operative in collapsing the cart to translate the chassis member longitudinally of the body member responsive to said chassis being turned on its pivot axis from its use position in which said chassis is disposed at a right angle to the body member to its storage position in which it extends longitudinally with said body member.

References Cited in the file of this patent

UNITED STATES PATENTS

| | | |
|---|---|---|
| 669,222 | Ruher | Mar. 5, 1901 |
| 908,472 | Lyons | Jan. 5, 1909 |
| 1,276,067 | Hurd | Aug. 20, 1918 |
| 1,951,492 | Schneider | Mar. 20, 1934 |
| 2,482,372 | Rossow | Sept. 20, 1949 |
| 2,517,065 | Watson | Aug. 1, 1950 |
| 2,518,803 | Marvin | Aug. 15, 1950 |
| 2,564,828 | Alexander | Aug. 21, 1951 |
| 2,681,810 | Lowinski | June 22, 1954 |
| 2,713,495 | Baumann | July 19, 1955 |